Sept. 12, 1933.     G. H. OSGOOD     1,926,301
PLYWOOD LAP JOINT SEAM
Filed Jan. 18, 1932
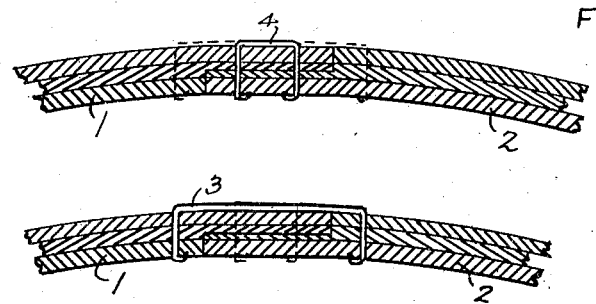
Fig. 1
Fig. 2
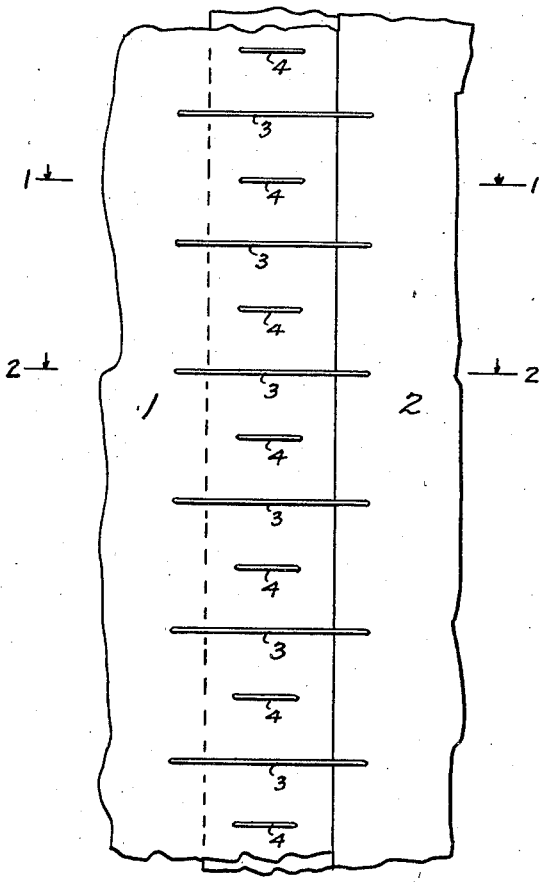
Fig. 3
Inventor
George H. Osgood.
By
Attorney Patented Sept. 12, 1933

1,926,301

UNITED STATES PATENT OFFICE 1,926,301

PLYWOOD LAP-JOINT SEAM

George H. Osgood, Tacoma, Wash.

Application January 18, 1932. Serial No. 587,376

3 Claims. (Cl. 217—65)

This invention relates to means for fastening two wooden bodies together through a lap-joint and has special reference to the seams between any two sections of a plywood barrel, such as is set forth in my copending application for patent for improvements in Barrels, filed under Serial Number 516,591.

The objects of my invention are to provide means which ties the two sections together without overstraining the lapped parts in the joint, and means to simultaneously secure the two lapped parts together, thereby maintaining the cylindrical form of the barrel and carrying the bursting stress across the seam. Another object is to provide a fastening means for the seam, which is cheap and easy to apply and very effective in use.

I attain these and other objects by the devices and arrangements illustrated in the accompanying drawing, in which—

Figs. 1 and 2 are cross-sections of the barrel seam, taken on the lines 1—1 and 2—2, respectively, in Fig. 3; and Fig. 3 is an elevation of my improved barrel seam.

Similar numerals of reference refer to similar parts throughout the several views.

The barrel or other article to which my invention is particularly applicable comprises a plywood structure, having three or more plies, and including at least one seam between the parts thereof. The abutting edges of the plywood sections 1 and 2 are complementarily cut away to one-half their original thickness and lap each other to complete the joint without any increase in thickness of the barrel wall.

The grain of the outer plies of the plywood of which the barrel is made usually runs axially of the barrel, or parallel with the lap-joint or seam between the sections, and the grain of the central ply usually runs circumferentially. However, at the lap-joint, the central ply is cut centrally and forms two central plies, each having only one-half the thickness of the original ply. Now, the strength of each ply is about twice as great under stress in the direction of its grain as it is across its grain. The bursting stress of the seam of the barrel is circumferential or parallel with the grain of the central layer and, since the central layer is only one-half thickness at the lap-joint, it follows that if the seam is made by fastening through the lapped parts alone, it would be overstrained under the bursting pressure due to the weight of the materials in the barrel. For this reason I tie the two parts 1 and 2 together by the broad staples 3 which span the entire seam and enter the said parts 1 and 2 at points well removed from the lap-joint. These staples 3 are inserted with their central shanks at right-angles to the seam and therefore transfer the tensile stress across the lap-joint and relieve the said joint of the greater part of said bursting stress. The prongs of the staples 3 are driven entirely through the sections 1 and 2 and are clinched thereinto on the inner side thereof.

However, it is also necessary to clamp the complementary parts of the lap-joint together and this is done by the series of narrow staples 4 which are preferably inserted midway between each of the above-described broad staples 3. These narrow staples 4 are also inserted with their central shanks at right-angles to the seam and they accomplish the combined functions of transferring a portion of the bursting stress through the lap-joint and of clamping the two lapped parts of the joint together. The prongs of the narrow staples 4 also are driven entirely through both lapped parts and are clinched thereinto on the inner side thereof.

Thus it will be seen that my improved seam firmly fastens the lap-joint parts together, and effectively transmits the bursting stress from one section to the other across the said seam without overstraining the joint.

Having described my invention, what I claim and desire to secure by Letters Patent, is—

1. In a lap-joint seam joining two parts of glued plywood, wherein the grain of at least one ply is parallel with the seam and the grain of at least one ply is at right-angles to the seam, the combination of a series of tension members spanning the lap-joint and carrying the bursting stress thereacross; and a series of fastening members positioned between said tension members and passing through all the plies at the lap-joint and holding the two parts of the seam together.

2. In a lap-joint seam joining two parts of glued plywood, wherein the grain of at least one ply is parallel with the seam and the grain of at least one ply is at right-angles to the seam, the combination of a series of broad staples spanning the lap-joint and carrying the bursting stress thereacross; and a series of narrow staples positioned between said broad staples and passing through all the plies at the lap-joint and holding the two parts of the seam together.

3. In a lap-joint seam joining two parts of glued plywood, having three or more plies, wherein the grain of alternate plies run at right-angles to each other, the edges of said parts being complementarily cut away whereby each part is provided with one-half the thickness of the plies whose grain runs either parallel with or at right-angles to the seam, the combination of a series of broad staples spanning the lap-joint and carrying the bursting stress thereacross; and a series of narrow staples positioned between said broad staples and passing through all the plies at the lap-joint and holding the two parts of the seam together.

GEORGE H. OSGOOD.